US012655234B2

(12) United States Patent
Gupta et al.

(10) Patent No.: US 12,655,234 B2
(45) Date of Patent: Jun. 16, 2026

(54) PROCESS FOR PREPARATION OF A CATALYST WITH A POLYOLEFIN COAT

(71) Applicant: RELIANCE INDUSTRIES LIMITED, Mumbai (IN)

(72) Inventors: Virendra Kumar Gupta, Navi Mumbai (IN); Umesh Makwana, Surat (IN); Bhavesh Kiritbhai Desai, Surat (IN); Priyanshu Bharatkumar Vyas, Surat (IN); Sanket Kirankumar Shah, Surat (IN); Hiren Manojkumar Bhajiwala, Surat (IN); Sanjay Govindbhai Chauhan, Surat (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 269 days.

(21) Appl. No.: 17/642,474

(22) PCT Filed: May 5, 2021

(86) PCT No.: PCT/IB2021/053767
§ 371 (c)(1),
(2) Date: Mar. 11, 2022

(87) PCT Pub. No.: WO2021/224806
PCT Pub. Date: Nov. 11, 2021

(65) Prior Publication Data
US 2022/0298271 A1     Sep. 22, 2022

(30) Foreign Application Priority Data

May 5, 2020    (IN) ............................ 202021019157

(51) Int. Cl.
| | |
|---|---|
| *B05D 7/24* | (2006.01) |
| *B01J 35/40* | (2024.01) |
| *C08F 4/02* | (2006.01) |
| *C08F 4/642* | (2006.01) |
| *C08F 10/06* | (2006.01) |

(52) U.S. Cl.
CPC ............. *C08F 4/6425* (2013.01); *B01J 35/40* (2024.01); *C08F 4/027* (2013.01); *C08F 10/06* (2013.01)

(58) Field of Classification Search
None
See application file for complete search history.

(56) References Cited

U.S. PATENT DOCUMENTS

| | | | | |
|---|---|---|---|---|
| 4,241,112 A | * | 12/1980 | Kostandov | ............... B01J 13/02 |
| | | | | 526/901 |
| 7,582,711 B2 | | 9/2009 | Kuo et al. | |
| 7,943,545 B2 | | 5/2011 | Barre et al. | |
| 2008/0194780 A1 | * | 8/2008 | Kuo | ...................... C08F 210/16 |
| | | | | 526/170 |
| 2022/0162356 A1 | * | 5/2022 | Marin | ................... C08F 210/06 |

FOREIGN PATENT DOCUMENTS

| | | | | |
|---|---|---|---|---|
| CA | 2651651 A1 | * | 11/2006 | .......... B01F 13/1047 |
| CN | 101133092 A | | 2/2008 | |

OTHER PUBLICATIONS

International Search Report of PCT/IB2021/053767, mailed Sep. 17, 2021 in English.
Notice of Transmittal of International Search Report of PCT/IB2021/053767, mailed Sep. 17, 2021 in English.
Written Opinion of the International Searching Authority of PCT/IB2021/053767, mailed Sep. 17, 2021 in English.

* cited by examiner

*Primary Examiner* — Yun Qian
(74) *Attorney, Agent, or Firm* — Collard & Roe, P.C.

(57) ABSTRACT

The present disclosure relates to a process for preparation of a catalyst with a polyolefin coat. The process of the present disclosure is simple, economical and requires 50% less reaction time to obtain a desired catalyst with polyolefin coat. The catalyst obtained by the process of the present disclosure is capable of reducing generation of polymer fines by at least 50%, which leads to improved plant operability and throughput.

7 Claims, No Drawings

1

PROCESS FOR PREPARATION OF A CATALYST WITH A POLYOLEFIN COAT

CROSS REFERENCE TO RELATED APPLICATIONS

This application is the National Stage of PCT/IB2021/053767 filed on May 5, 2021, which claims priority under 35 U.S.C. § 119 of Indian Application No. 202021019157, filed on May 5, 2020, the disclosure of which is incorporated by reference. The international application under PCT article 21(2) was published in English.

FIELD

The present disclosure relates to a process for preparation of a catalyst with a polyolefin coat.

Definitions

As used in the present disclosure, the following terms are generally intended to have the meaning as set forth below, except to the extent that the context in which they are used indicates otherwise.

The term "Polyolefin coat" as used in the context of the present disclosure refers to a technique/process wherein a controlled polymerization of olefin monomers is carried out in the presence of a catalyst in a separate and a smaller reactor. The polymerization of olefin monomers is allowed to proceed until the monomers are reacted on the catalyst surface to form a poly-olefin coating of an intermediate molecular mass.

The term "degree of polymerization" as used in the context of the present disclosure refers to the number of monomeric units present in the polymerized olefin.

The term "polymer-fines" or "polyolefin fines" as used in the context of the present discourse, refers to polymers/polyolefins having an average particle size below 100 μm.

The term "D10" as used in the context of the present discourse, refers to the diameter at which 10% of the sample's mass comprises particles with a diameter less than this value.

The term "D50" as used in the context of the present discourse, refers to the diameter at which 50% of a sample's mass comprises particles with a diameter less than this value and 50% of the sample's mass comprises particles with a diameter greater than this value.

The term "D90" as used in the context of the present discourse, refers to the diameter at which 90% of the sample's mass comprises particles with a diameter less than this value.

BACKGROUND

The background information herein below relates to the present disclosure but is not necessarily prior art.

Different catalyst systems are known for their ability to catalyze the polymerization of olefins. Conventional catalyst systems comprise a pro-catalyst and a co-catalyst. Additionally, catalyst may comprise other agents such as a selectivity control agent (SCA) and an internal electron donor.

The phenomenon of particle replication is an important characteristic of heterogeneous polymerization catalysts, as a result of which the morphology of the catalyst, and the particle size of the catalyst and its distribution, is reproduced in the polymer. However, a major disadvantage of the conventional processes is the non-uniform morphology of the catalyst particles, and the higher particle size of the catalyst and its distribution.

Polymerization is an exothermic reaction that occurs at the active site of the polymerization catalyst. In an initial stage of polymerization, the heat generated at the active sites, polymer accumulation within the pores of the catalyst, and the growing polymer forces the catalyst to disintegrate into small fragments. The fine particle generation results in low bulk density of the polymer and also causes operating process difficulties in the fluidized bed reactors.

To overcome the difficulties of conventional catalysts, polymerization has been carried out, which forms a polymer coating on the catalyst. The polymer coating imparts additional strength to the catalyst to withstand the thermal effect of the reaction. The catalysts coated with polymer are capable of arresting fragmentation of particles, leading to reduced resin fines, reduced resin carry-over and circumvents the formation of agglomerates or lumps.

However, the conventional processes are expensive because of the use of higher boiling solvents. Further, the conventional processes require longer reaction time and are uncontrollable.

There is, therefore, felt a need for an alternative process for preparation of a catalyst with a polyolefin coat which overcomes the aforestated drawbacks.

OBJECTS

Some of the objects of the present disclosure, which at least one embodiment herein satisfies, are as follows:

An object of the present disclosure is to ameliorate one or more problems of the prior art or to at least provide a useful alternative.

Another object of the present disclosure is to provide a simple and economical process for the preparation of a catalyst with a polyolefin coat.

Yet another object of the present disclosure is to provide a process for the preparation of a catalyst with a polyolefin coat which is controllable and requires less time.

Still another object of the present disclosure is to provide a catalyst with a polyolefin coat.

Yet another object of the present disclosure is to provide a catalyst with a polyolefin coat which during polymerization generates a reduced amount of polyolefin fines.

Other objects of the present invention will be more apparent to a person skilled in the art from the description provided hereinafter.

SUMMARY

The present disclosure relates to a process for preparation of a catalyst with a polyolefin coat. The process comprises mixing in a reactor, a pro-catalyst and a co-catalyst and a fluid medium to obtain slurry. The slurry is stirred under inert gas atmosphere at a temperature in the range of 20° C. to 50° C. to homogenize the slurry and generate particles of the catalyst. A gaseous olefin monomer is then introduced into the reactor having the catalyst, at a monomer pressure in the range of 1.0 kg/cm² to 5.0 kg/cm². The olefin monomer is subjected to polymerization in the presence of the catalyst in a controlled manner to ensure that the degree of polymerization of the olefin is in the range of 3% to 30%. The polymerization is carried out at a temperature in the range of 20° C. to 50° C. under continuous stirring having a stirring speed in the range of 400 rpm to 600 rpm for a predetermined time period to obtain a product mixture comprising the catalyst with the polyolefin coat and an unreacted gaseous olefin monomer. The predetermined time period is in the range of 100 to 500 minutes. Preferably, the predetermined time period is in the range of 180 to 380 minutes. The unreacted gaseous olefin monomer is then vented off from the reactor and the catalyst is separated from the product mixture, followed by drying to obtain the catalyst with the polyolefin coat.

A catalyst with a polyolefin coat obtained by the process of the present disclosure is characterized by having a mean particle size in the range of 15 to 35 μm, a surface area in the range of 35 to 41 m²/g, a pore diameter in the range of 1.2 to 1.8 μm, a porosity in the range of 9% to 13% and a bulk density in the range of 0.45 to 0.63 g/cm³.

DETAILED DESCRIPTION

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Different catalysts are known for catalyzing the polymerization of olefins. During the polymerization process, heat is generated at the active sites of the catalyst, which leads to fragmentation of the catalyst particles. The fragmentation of catalyst further leads to generation of polymer/polyolefin fines. The fine particle generation results in low bulk density of the polymer/polyolefin and also causes operating process difficulties in the fluidized bed reactors.

Polymer/polyolefin coating of the catalyst systems imparts strength to the catalyst to withstand the thermal effect of the polymerization reaction, thereby arresting fragmentation of catalyst particles, leading to reduced resin fines. However, the conventional processes for preparing the polymer/polyolefin coated catalysts are expensive. Further, the conventional processes require longer reaction time and polymerization reactions are uncontrollable.

The present disclosure provides a simple and economical process for preparation of a catalyst with a polyolefin coat. The present disclosure also provides the effect of the catalyst with the polyolefin coat of the present disclosure on the process of polymerization of an olefin.

In one aspect, the present disclosure provides the process for preparation of the catalyst with the polyolefin coat. The process is described in detail herein below.

Initially, in a reactor, a pro-catalyst and a co-catalyst are mixed in a fluid medium to obtain slurry.

The pro-catalyst is a transition metal based catalyst supported on a magnesium. The transition metal is at least one selected from the group consisting of scandium, titanium, vanadium, chromium, iron, cobalt, nickel, copper, zirconium, chromium and palladium.

The source of transition metal is a compound selected from the group consisting of a halide, an oxide and an alkoxide. In accordance with the present disclosure, the transition metal compound is at least one selected from titanium tetrachloride, and titanium trichloride, preferably titanium tetrachloride. In an exemplary embodiment, the transition metal compound is titanium tetrachloride.

The source of magnesium is at least one selected from the group consisting of magnesium chloride, magnesium oxide, and magnesium alkoxide. In accordance with the embodiments of the present disclosure, the source of magnesium is selected from the group consisting of magnesium methoxide, magnesium ethoxide, magnesium iso-propoxide, magnesium n-butoxide, magnesium phenoxide, and magnesium dichloride. In an exemplary embodiment, the source of magnesium is magnesium dichloride.

The co-catalyst is at least one organoaluminum compound selected from the group consisting of triethyl aluminum, tri-n-butyl aluminum, tri-isopropyl aluminum, tri-isoprenyl aluminum, tri-isobutyl aluminum, diethyl aluminum chloride, di-isobutyl aluminum chloride, triphenyl aluminum, tri-n-octyl aluminium, and tri-n-decyl aluminum. In an exemplary embodiment, the co-catalyst is triethyl aluminum.

The molar ratio of aluminum in the co-catalyst to the transition metal in the pro-catalyst is in the range of 0.5:1 to 3.5:1.

The fluid medium is selected from a high boiling solvent and a low boiling solvent. In accordance with the present disclosure, the fluid medium is white mineral oil, n-hexane, cyclohexane, and iso-pentane. In accordance with an embodiment of the present disclosure, the high boiling fluid medium is white mineral oil and the low boiling solvent is selected from n-hexane, cyclohexane, and iso-pentane.

The catalyst optionally comprises an electron donor selected from the group consisting of isopropylmyristate, methyl benzoate, ethyl benzoate, n-propyl benzoate, i-propyl benzoate, n-butyl benzoate, i-butyl benzoate, di-methyl phthalate, di-ethyl phthalate, di-propyl phthalate, di-isopropyl phthalate, di-butyl phthalate, di-isobutyl phthalate, di-octyl phthalate and di-isooctyl phthalate.

In the next step, the slurry obtained is stirred under inert gas atmosphere with the help of a gas dispersion hallow shaft at a temperature in the range of 20° C. to 50° C. to homogenize the slurry and generate particles of the catalyst. In an embodiment, the slurry is stirred for a time period in the range of 1 minutes to 5 minutes to generate particles of the catalyst. In accordance with the present disclosure, the particle size of the catalyst in the slurry is in the range of 20 microns to 30 microns; preferably, the particle size of the catalyst in the slurry is in the range of 25 microns to 28 microns.

In an exemplary embodiment, the slurry is stirred under inert gas atmosphere with the help of gas dispersion hallow shaft at 30° C. for 3 minutes to obtain a catalyst.

Conventional agitators allow gas to exit the vessel almost immediately, thereby resulting in poor gas dispersion, leading to reduced polymerization. However, the gas dispersion hallow shaft agitator has high pumping capacity, which provides effective gas retention. Therefore, it is capable of providing extended the interfacial contact between gas and solid, which enhances polymerization.

In accordance with the embodiment of the present disclosure, the catalyst is a Ziegler-Natta catalyst.

The inert gas is at least one selected from nitrogen and argon. Preferably, the inert gas is nitrogen.

A gaseous olefin monomer is then introduced into the reactor having the catalyst, at a monomer pressure in the range of 1.0 kg/cm$^2$ to 5.0 kg/cm$^2$. The olefin monomer is then subjected to polymerization in the presence of the catalyst in a controlled manner to ensure that the degree of polymerization of the olefin is in the range of 3% to 30%. Preferably, the degree of polymerization of the poly-olefin is in the range of 15% to 25%. The polymerization is carried out at a lower temperature having a temperature in the range of 20° C. to 50° C., under continuous stirring with the help of a gas dispersion hallow shaft at a stirring speed in the range of 400 to 600 rpm, for a predetermined time period to obtain a product mixture comprising the catalyst with the polyolefin coat and an unreacted gaseous olefin monomer.

In accordance with the present disclosure, the predetermined time period is in the range of 100 to 500 minutes. Preferably, the predetermined time period is in the range of 180 to 380 minutes.

The process of the present disclosure is optimized in such a way that the degree of polymerization of the olefin is in the range of 3% to 30%. The degree of the polymerization of the olefin increases with increasing time period.

The un-reacted gaseous olefin monomer is then vented off from the reactor and the catalyst is separated from the product mixture, followed by drying to obtain the catalyst with the polyolefin coat.

The olefin monomer is selected from ethylene and propylene. In accordance with the exemplary embodiment of the present disclosure, the olefin monomer is ethylene.

In accordance with an embodiment of the present disclosure, the step of polymerization of the olefin monomer in a controlled manner is carried out in the presence of nitrogen. Nitrogen acts as self-limiting agent during polymerization, thereby controlling the reaction kinetics. The controlled reaction kinetics further helps in controlling the initial heat of polymerization which in turn helps in reducing the catalyst attrition or the generation of fines.

In another aspect, the present disclosure provides a catalyst with a polyolefin coat.

The catalyst with the polyolefin coat comprises a pro-catalyst and a co-catalyst; and a poly-olefin component. In accordance with the present disclosure, the poly-olefin component is coated on the catalyst; and the degree of polymerization is in the range of 3% to 30%.

The catalyst with the polyolefin coat is characterized by having a mean particle size in the range of 15 to 35 μm, a surface area in the range of 35 to 41 m$^2$/g, a pore diameter in the range of 1.2 to 1.8 μm, a porosity in the range of 9% to 13% and a bulk density in the range of 0.45 to 0.63 g/cm$^3$.

The catalyst with the polyolefin coat of the present disclosure has increased surface area, smaller average pore diameter, increased porosity, and increased bulk density than the non-coated catalyst. The catalyst has improved particle morphology and settling properties, as compared to the conventional non-coated catalyst.

In a still another aspect, the present disclosure provides a process for the polymerization of olefins by using the catalyst with the polyolefin coat of the present disclosure. The polymerization is carried out in gas-phase.

The process for polymerizing an olefin monomer in the presence of the catalyst with the polyolefin coat, involves mixing the catalyst with polyolefin coat, the co-catalyst, optionally, the external electron donor in a fluid medium under an inert atmosphere to obtain an activated catalyst with polyolefin coat. Monomers of olefin are polymerized in the presence of the catalyst with the polyolefin coat, at a temperature in the range of 65° C. to 75° C., under the olefin monomer pressure in the range of 4.5 kg/cm$^2$ to 33 kg/cm$^2$, and at an agitation speed in the range of 300 to 1100 rpm, for a time period in the range of 90 to 150 minutes to obtain polyolefin.

The external electron donor is at least one selected from the group consisting of cyclohexyldimethoxysilane, methyl dimethoxysilane, iso-butyl dimethoxysilane, iso-propyl dimethoxysilane, and cyclopentyldimethoxysilane, preferably cyclohexyldimethoxysilane.

The polyolefin obtained by the process of the present disclosure is characterized by having an average particle size in the range of 0.016 to 0.051 μm, a melt flow index in the range of 1.3 to 8.2 g/10 min and a bulk density in the range of 0.24 to 0.38 g/cm$^3$.

The amount of the polyolefin fines generated during polymerization is in the range of 1% to 5% of the total amount of the polyolefin. The reduced generation of poly-olefin fines helps in stable reactor operability which leads to improved bulk density and overall improved morphology of polyolefin obtained.

The catalyst with the polyolefin coat has higher catalytic productivity for polymerization of olefins as compared to non-coated catalyst. In accordance with the embodiments of the present disclosure, the productivity of the catalyst with the polyolefin coat is in the range of 8 to 80 kg polypropylene per gram of catalyst.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be tested to scale up to industrial/commercial scale and the results obtained can be extrapolated to industrial scale.

Experimental Details

Experiment-1: Preparation of Ziegler-Natta Catalyst with Polyethylene Coat.

Example 1: 100 g of Ti/Mg alkoxides and 9.4 g of tri-ethyl aluminium was mixed with 90.6 g white mineral oil as a fluid medium to obtain slurry. The slurry was stirred for 3 minutes under nitrogen atmosphere, at 40° C. in a stainless steel CSTR reactor to obtain the Ziegler-Natta catalyst. The reactor was then purged with ethylene gas at a pressure of 0.1 kg/cm² for 5 min to remove nitrogen completely from the reactor. The polymerization of ethylene in a controlled manner was carried out at ethylene pressure of 1 Kg/m², at 40° C. for 180 minutes to obtain a product mixture comprising the catalyst. On completion of the reaction, hydrocarbon gases, including ethylene monomer were slowly vented off through a vent line and a Ziegler-Natta catalyst with the polyethylene coat (Cat-1) was separated from the product mixture and evaluated for its properties.

TABLE 1

Comparison of characteristics of Ziegler-Natta catalyst with polyethylene coat with non-coated Ziegler-Natta catalyst.

| Characteristics | Non coated catalyst | PE coated catalyst |
|---|---|---|
| Total specific surface area (m²/g) | 33.1 | 38.4 |
| Average pore diameter (μm) | 1.9 | 1.46 |
| Porosity (%) | 8.1 | 11.0 |
| Bulk Density (g/cm³) | 0.42 | 0.54 |

It is clearly seen from Table-1 that the Ziegler-Natta catalyst with polyethylene coat of the present disclosure has a narrower average pore diameter, greater porosity, greater surface area, and greater bulk density compared to non-coated Ziegler-Natta catalyst.

TABLE 2

Comparison of settling properties of Ziegler-Natta catalyst with polyethylene coat and a non-coated catalyst.

| Time (hrs) | Non coated catalyst volume (ml) | catalyst with polyethylene coat volume (ml) |
|---|---|---|
| 0.1 | 100 | 100 |
| 0.3 | 97 | 98 |
| 2 | 93 | 95 |
| 3 | 90 | 94 |
| 7 | 85 | 89 |
| 20 | 69 | 57 |
| 45 | 52 | 55 |
| 70 | 42 | 55 |
| 120 | 29 | 55 |
| 150 | 25 | 55 |
| 200 | 23 | 55 |

It is clearly seen from Table-2 that the Ziegler-Natta catalyst with polyethylene coat of the present disclosure has better settling characteristics over a period of time as compared to the settling characteristics of the non-coated catalyst.

Examples 2-4: Ziegler-Natta catalysts with polyethylene coat (Cat-2 to Cat-4) were prepared by the process as described in Example 1, except the type of agitators used for stirring the reaction mixture. The results are tabulated in Table 3 below:

TABLE 3

Effect of use of different agitators on the polyethylene coat formed on Ziegler-Natta catalyst of the present disclosure.

| Experiment No. | Ex-1 | Ex-2 | Ex-3 | Ex-4 |
|---|---|---|---|---|
| catalyst with polyethylene coat prepared | Cat-1 | Cat-2 | Cat-3 | Cat-4 |
| Solvent/ Fluid medium | Mineral oil | Mineral oil | Mineral oil | Mineral oil |
| Viscosity (cSt) | 65-90 | 65-90 | 65-90 | 65-90 |
| Mineral oil quantity (g) | 90.6 | 90.6 | 67.8 | 67.8 |
| Pro-catalyst quantity (g) | 100 | 100 | 75 | 75 |
| Co-catalyst quantity (g) | 9.4 | 9.4 | 7.2 | 7.2 |
| Reactant quantity(g) | 200 | 200 | 150 | 150 |
| Al/Ti mole ratio | 3 | 3 | 3 | 3 |
| Agitator type | 6 bladed pitch type | Gas dispersion hollow shaft | 6 bladed pitch type | Gas dispersion hollow shaft |
| Agitator speed (rpm) | 600 | 600 | 600 | 600 |
| Monomer | Ethylene | Ethylene | Ethylene | Ethylene |
| Reaction temperature (° C.) | 40 | 40 | 40 | 40 |
| Reaction Pressure (kg/cm²) | 1.0 | 1.0 | 1.0 | 1.0 |
| Reaction time (min) | 180 | 180 | 180 | 180 |
| polyolefin coating (%) | 3.4 | 10.2 | 5.8 | 23.4 |

It is seen from Table-3 that use of gas dispersed hollow shaft type agitator enhances polyethylene coating on the Ziegler-Natta catalyst (Ex 2 and 4). It is also observed that a reduction in the total quantity of the reactants in a batch further enhances polyethylene coating on the Ziegler-Natta catalyst (Ex 4).

Examples 5-6

Ziegler-Natta catalysts with polyethylene coat (Cat-5 to Cat-6) were prepared by the process as described in Example 1, except the reaction time. The results are tabulated in Table 4 below:

TABLE 4

Effect of change in reaction time on polyethylene coating formed on Ziegler-Natta catalyst of the present disclosure.

| Experiment No. | Ex-4 | Ex-5 | Ex-6 |
|---|---|---|---|
| catalyst with polyethylene coat prepared | Cat-4 | Cat-5 | Cat-6 |
| Solvent | Mineral oil | Mineral oil | Mineral oil |
| Viscosity (cSt) | 65-90 | 65-90 | 65-90 |
| Mineral oil quantity (g) | 67.8 | 67.8 | 67.8 |
| Pro-catalyst quantity (g) | 75 | 75 | 75 |
| Co-catalyst quantity (g) | 7.2 | 7.2 | 7.2 |
| Reactant quantity(g) | 150 | 150 | 150 |

TABLE 4-continued

Effect of change in reaction time on polyethylene coating
formed on Ziegler-Natta catalyst of the present disclosure.

| Experiment No. | Ex-4 | Ex-5 | Ex-6 |
|---|---|---|---|
| Al/Ti mole ratio | 3 | 3 | 3 |
| Agitator type | Gas dispersion hollow shaft | Gas dispersion hollow shaft | Gas dispersion hollow shaft |
| Agitator speed (rpm) | 600 | 600 | 600 |
| Monomer | Ethylene | Ethylene | Ethylene |
| Reaction temperature (° C.) | 40 | 40 | 40 |
| Reaction pressure (kg/cm$^2$) | 1.0 | 1.0 | 1.0 |
| Reaction time (min) | 180 | 360 | 480 |
| polyolefin coating (%) | 23.4 | 28.0 | 32.2 |

It is observed from Table-4 that, as the reaction time increased from 180 minutes to 480 minutes, the amounts of polyethylene coating on the catalyst increased from 23.4% to 32.2%.

Although, the amount of polyethylene coating increased, with time, the rate of increase in the polyethylene coating is slower as the time increased from 180 to 480 minutes. Thus, the efficiency of the catalyst with polyethylene coat decreases with increase in time, which could be a result of the reduced access to the active sites of the catalyst as a result of increase in the polyethylene coating.

Examples 7-10

Ziegler-Natta catalysts with polyethylene coat (Cat-7 to Cat-10) were prepared by the process as described in Example 1, except Al/Ti ratio. The results are tabulated in Table 5 below:

TABLE 5

Effect variation of Al/Ti ratio on the polyethylene coating
formed on Ziegler-Natta catalyst of the present disclosure.

| Experiment No. | Ex-7 | Ex-8 | Ex-9 | Ex-10 |
|---|---|---|---|---|
| catalyst polyethylene coat prepared | Cat-7 | Cat-8 | Cat-9 | Cat-10 |
| Solvent | Mineral oil | Mineral oil | Mineral oil | Mineral oil |
| Viscosity (cSt) | 65-90 | 65-90 | 65-90 | 3-5 |
| Al/Ti mole ratio | 0.6 | 1.2 | 1.5 | 3 |
| Agitator speed (rpm) | 600 | 600 | 600 | 600 |
| Reaction temperature (° C.) | 40 | 40 | 40 | 35 |
| Reaction pressure (kg/cm$^2$) | 1.0 | 1.0 | 1.0 | 0.5 |
| Reaction time (min) | 120 | 120 | 120 | 120 |
| polyolefin coating (%) | 18.1 | 20.8 | 24.1 | 38.6 |

It is evident from Table-5 that as the Al/Ti ratio increased from 0.6 to 3, the poly-olefin coating formed on the catalyst increased from 18.1% to 38.6%.

Examples 11-13

Ziegler-Natta catalysts with polyethylene coat (Cat-11 to Cat-13) were prepared by the process as described in Example 1, except the purity of ethylene monomer. The results are tabulated in Table 6 below.

TABLE 6

Effect of ethylene purity on the polyethylene coating formed
on Ziegler-Natta catalyst of the present disclosure.

| Experiment No. | Ex-11 | Ex-12 | Ex-13 |
|---|---|---|---|
| catalyst with polyethylene coat prepared | Cat-11 | Cat-12 | Cat-13 |
| Ethylene (%) | 99.500 | 99.950 | 99.999 |
| O$_2$ (ppm) | 100 | 10 | <2 |
| H$_2$O (ppm) | 5 | 5 | <2 |
| CO$_2$ (ppm) | 15 | 0.1 | <2 |
| CO (ppm) | 5 | 0.1 | <2 |
| Nitrogen (ppm) | 300 | 0.4 | <2 |
| Other THC (ppm) | 4000 | <400 | <80 |
| Solvent | Mineral oil | Mineral oil | Mineral oil |
| Viscosity (cSt) | 65-90 | 65-90 | 65-90 |
| Al/Ti mole ratio | 3 | 3 | 3 |
| Agitator speed (rpm) | 600 | 600 | 600 |
| Reaction temperature (° C.) | 35 | 35 | 35 |
| Reaction pressure (kg/cm$^2$) | 1 | 1 | 1 |
| Reaction time (min) | 120 | 120 | 120 |
| polyolefin coating (%) | 17 | 25 | 27 |

From Table-6, it is clear that, during the preparation of Ziegler-Natta catalyst with polyethylene coat, the amount of the polyethylene coating increased from 17 wt % to 27 wt % when highly pure ethylene is used. Hence, ethylene purity plays an important role during the formation of polyethylene coating on Ziegler-Natta catalyst.

General Procedure: Polymerization of Olefin Monomer in the Presence of the Ziegler-Natta Catalyst with Polyolefin Coat of the Present Disclosure A slurry of the Ziegler-Natta catalyst with polyolefin coat, co-catalyst (5%) and external donor (5%) in decane were charged at 50° C., in a dry autoclave. Hydrogen (1.8 liters gas) was supplied into the reactor. Propylene was continuously supplied into the reactor while maintaining the reactor pressure at 32 bars to obtain a reaction mixture. The reaction mixture in the reactor was heated at 67° C., for 60 minutes to obtain a product mixture comprising polymer. The product mixture was cooled to 50° C., gaseous hydrocarbons were vented off and the product mixture was subjected to post-reaction work up to obtain polypropylene.

Examples 14-17

Ziegler-Natta catalysts with polyethylene coat (Cat-14 to Cat-17) were prepared by the process as described in Example 1, except Al/Ti ratio. The results are tabulated in Table 7 below. Further, polymerization of the olefin monomer (propylene) is carried out using the Ziegler-Natta catalysts (Cat-14 to Cat-17) by the process as described herein above. The results are tabulated in Table 7 below.

TABLE 7

Effect variation of Al/Ti ratio on the polyethylene coating formed on Ziegler-Natta catalyst of the present disclosure.

| Catalyst | Conventional catalyst without coating | Cat-14 | Cat-15 | Cat-16 | Cat-17 |
|---|---|---|---|---|---|
| Ethylene polymerization (ethylene coating on the catalyst) | | | | | |
| Medium | — | H-380 | H-380 | H-380 | W-40 |
| Al/Ti mole ratio | — | 0.6 | 1.2 | 1.5 | 3 |
| Agitator speed (rpm) | — | 600 | 600 | 600 | 600 |
| Reaction temperature (° C.) | — | 40 | 40 | 40 | 35 |
| Reaction pressure (kg/cm$^2$) | — | 1.0 | 1.0 | 1.0 | 0.5 |
| Reaction time (min) | — | 120 | 120 | 120 | 120 |
| polyolefin coating (%) | — | 18.1 | 20.8 | 4.1 | 38.6 |
| Propylene Polymerization | | | | | |
| Al/Ti mole ratio | 700 | 700 | 700 | 700 | 700 |
| Al/D mole ratio | 4.15 | 4.15 | 4.15 | 4.15 | 4 |
| Reaction pressure (kg/cm$^2$) | 32 | 32 | 32 | 32 | 32 |
| Reaction temperature (° C.) | 67 | 67 | 67 | 67 | 67 |
| Reaction time (min) | 120 | 120 | 120 | 120 | 120 |
| Agitator speed (rpm) | 1000 | 1000 | 1000 | 1000 | 1000 |
| Catalyst productivity (kg PP/g cat) | 40.6 | 77.0 | 47.7 | 37.5 | 62.4 |
| Melt flow index (g/10 min) | 1.4 | 4.2 | 8.2 | 4.7 | 3.1 |
| Xylene soluble (wt %) | 1.7 | 1.8 | 1.4 | 1.4 | 1.3 |
| Average particle size (in) | 0.016 | 0.035 | 0.051 | 0.032 | 0.041 |
| Bulk density (g/cc) | 0.35 | 0.36 | 0.33 | 0.38 | 0.28 |
| Fines (wt %) | 23.8 | 1.6 | 1.0 | 2.8 | 2.9 |

It is evident from Table-7 that as the Al/Ti ratio increased from 0.6 to 3, the poly-olefin coating formed on the catalyst increased from 18.1% to 38.6%. Further, it is observed from table 7 that the poly-olefin coating in the range of 15 to 30% generates lesser fines.

Examples 18-20

Ziegler-Natta catalysts with polyethylene coat (Cat-18 to Cat-20) were prepared by the process as described in Example 1, except the polymerization is carried out in the presence of nitrogen. The results are tabulated in Table 8 below. Further, the polymerization of the olefin monomer is carried out by using the Ziegler-Natta catalysts (Cat-18 to Cat-20). The results are tabulated in Table 8 below.

TABLE 8

Effect of Nitrogen (N$_2$) on the polyethylene coating formed on Ziegler-Natta catalyst of the present disclosure.

| | Conventional catalyst without coating | Cat-18 | Cat-19 | Cat-20 |
|---|---|---|---|---|
| Polymerization- polyethylene coating on the catalyst | | | | |
| Fluid medium | — | W-40 | W-40 | H-380 |
| Al/Ti mole ratio | — | 3 | 3 | 1.2 |
| Agitator speed (rpm) | — | 600 | 600 | 600 |
| Monomer | — | Ethylene | Ethylene | Ethylene |

TABLE 8-continued

Effect of Nitrogen ($N_2$) on the polyethylene coating formed
on Ziegler-Natta catalyst of the present disclosure.

| | Conventional catalyst without coating | Cat-18 | Cat-19 | Cat-20 |
|---|---|---|---|---|
| Nitrogen atm | — | — | Nitrogen | Nitrogen |
| Reaction temperature (° C.) | — | 35 | 35 | 40 |
| Reaction pressure (kg/cm²) | — | 0.5 | 0.3 + 1.7 | 0.1 + 0.9 |
| Reaction time (min) | — | 120 | 120 | 120 |
| polyolefin coating (%) | — | 38.6 | 24.7 | 23.2 |
| Propylene Polymerization | | | | |
| Al/Ti mole ratio | 700 | 700 | 700 | 600 |
| Al/D mole ratio | 4.15 | 4 | 4 | 3.52 |
| Reaction pressure (kg/cm²) | 32 | 32 | 32 | 32 |
| Reaction temperature (° C.) | 67 | 67 | 67 | 67 |
| Reaction time (min) | 120 | 120 | 120 | 120 |
| Agitator speed (rpm) | 1000 | 1000 | 1000 | 1000 |
| Catalyst productivity (kg PP/g cat) | 40.6 | 62.4 | 44.1 | 11.9 |
| Melt flow index (g/10 min) | 1.4 | 3.1 | 4.4 | 6.8 |
| Xylene soluble (wt %) | 1.7 | 1.3 | 1.2 | 1.0 |
| Average particle size (in) | 0.016 | 0.041 | 0.035 | 0.033 |
| Bulk density (g/cc) | 0.35 | 0.28 | 0.24 | 0.33 |
| Fines (wt %) | 23.8 | 2.9 | 4.2 | 1.2 |

It is clearly seen from Table-8 that during the preparation of Ziegler-Natta catalyst with polyethylene coat, the use of nitrogen along with ethylene, drastically reduces the amount of polyethylene coated on Ziegler-Natta catalysts. Thus, nitrogen acts as self-limiting agent for the formation of polyethylene coating on Ziegler-Natta catalysts. Further, it is observed that the formation of fines is also reduced when the process is carried out in the presence of nitrogen.

Examples 21-23

Ziegler-Natta catalysts with polyethylene coat (Cat-21 to Cat-23) were prepared by the process as described in Example 1, except solvents used for polymerization. The results are tabulated in Table 9 below. Further, the polymerization of the olefin monomer is carried out using the Ziegler-Natta catalysts (Cat-21 to Cat-23) by the process as described herein above. The results are tabulated in Table 9 below.

TABLE 9

Effect of use of different solvents on the polyethylene coat
formed on Ziegler-Natta catalyst of the present disclosure.

| | Conventional catalyst without coating | Cat-21 | Cat-22 | Cat-23 |
|---|---|---|---|---|
| Solvent | — | witco-40 | n-hexane | n-hexane |
| Al/Ti mole ratio | — | 2 | 2 | 2 |

TABLE 9-continued

Effect of use of different solvents on the polyethylene coat
formed on Ziegler-Natta catalyst of the present disclosure.

| | Conventional catalyst without coating | Cat-21 | Cat-22 | Cat-23 |
|---|---|---|---|---|
| Agitator speed (rpm) | — | 400 | 400 | 400 |
| Reaction temperature (° C.) | — | 20 | 20 | 20 |
| Reaction pressure (kg/cm²) | — | 2.5 | 1 | 1 |
| Reaction time (min) | — | 240 | 60 | 120 |
| polyolefin coating (%) | — | 31 | 10 | 27 |
| Ti (wt %) | 2.6 | 1.8 | 1.4 | 1.8 |
| Mg (wt %) | 20.0 | 13.3 | 17.3 | 14.0 |
| Cl (wt %) | 60.9 | 41.1 | 52.3 | 42.0 |
| DIBP (wt %) | 11.0 | 6.9 | 6.9 | 5.0 |
| D10 (μm) | 4 | 11 | 4 | 10 |
| D50 (μm) | 21 | 35 | 15 | 32 |
| D90 (μm) | 38 | 53 | 25 | 49 |
| Dmean (μm) | 21 | 35 | 15 | 31 |
| Propylene Polymerization | | | | |
| Al/Ti mole ratio | 250 | 250 | 250 | 250 |
| Al/D mole ratio | 4 | 4 | 4 | 4 |
| H2 qty (ml) | 240 | 240 | 240 | 240 |
| Reaction pressure (kg/cm²) | 5 | 5 | 5 | 5 |
| Reaction temperature (° C.) | 70 | 70 | 70 | 70 |
| Solvent | n-hexane | n-hexane | n-hexane | n-hexane |
| Reaction time (min) | 120 | 120 | 120 | 120 |
| Agitator speed (rpm) | 400 | 400 | 400 | 400 |
| Catalyst Productivity (kg PP/g cat) | 9.5 | 9.0 | 8.9 | 9.5 |
| Melt flow index (g/10 min) | 1.5 | 3.0 | 1.7 | 1.5 |
| Xylene soluble (wt %) | 1.6 | 2.2 | 1.4 | 1.8 |
| Fines (wt %) | 10 | 4.8 | 4.9 | 4.5 |
| Polymer flakes (wt %) | 0 | 20 | 0 | 0 |

It is clearly observed from Table-9 that, during the preparation of Ziegler-Natta catalyst with polyethylene coat, by using a low boiling solvent such as n-hexane, 27% of the polyethylene coating on the catalyst is achieved in 120 minutes. Whereas, when a high boiling solvent is used for preparation of Ziegler-Natta catalyst with polyethylene coat, 31% of the polyethylene coating on the catalyst is achieved in 240 minutes.

Thus, the preparation of Ziegler-Natta catalyst with polyethylene coat, when carried out using a low boiling solvent, requires almost half the time and ethylene pressure, as compared to the preparation of Ziegler-Natta catalyst with polyethylene coat carried out using high boiling solvent to achieve a desired amount of polyethylene coating on the catalyst particles.

Further, the use of low boiling solvent also reduced 50% polypropylene resin fines generation without flakes generation.

Examples 24-25

Ziegler-Natta catalysts with poly-olefin coat (Cat-24 to Cat-25) were prepared by the process as described in Example 1 to obtain poly-olefin coated catalyst having higher coating. Further, the polymerization of the olefin monomer (propylene) is carried out using the Ziegler-Natta catalysts with poly-olefin coat (Cat-24 to Cat-25) by the process as described herein above. The results are tabulated in Table 10 below.

TABLE 10

Effect of higher polyolefin coating on the catalyst productivity.

| | Cat-24 | Cat-25 |
|---|---|---|
| Polyethylene coating on the catalyst | | |
| Fluid medium | n-hexane | n-hexane |
| Al/Ti mole ratio | 3.5 | 3.5 |
| Al/D mole ratio | 20 | 20 |
| Ti (wt %) | 1.3 | 2.3 |
| Reaction temperature (° C.) | 15 | 15 |
| Reaction pressure (kg/cm$^2$) | 1 | 1 |
| Reaction time (min) | 300 | 300 |
| polyolefin coating (%) | 95 | 96 |
| D10 (μm) | 9 | 10 |
| D50 (μm) | 40 | 38 |
| D90 (μm) | 59 | 60 |
| Dmean (μm) | 37 | 36 |
| polyolefin coating Mw (lacs) | 5.9 | 6.4 |
| Propylene Polymerization | | |
| Al/Ti mole ratio | 400 | 400 |
| Al/D mole ratio | 30 | 30 |
| H2 qty (ml) | 240 | 240 |
| Reaction pressure (kg/cm$^2$) | 6 | 6 |
| Reaction temperature (° C.) | 70 | 70 |
| Solvent | n-hexane | n-hexane |
| Reaction time (min) | 120 | 120 |
| Agitator speed (rpm) | 400 | 400 |
| Catalyst Productivity (kg PP/g cat) | 0 | 0 |

From Table 10 it is observed that the higher poly-olefin coating will not lead to polymerization.

TABLE 11

PENTAD & TRIAD fraction in non-coated and poly-olefin coated catalyst.

| | Polypropylene resin from non-coated catalyst | Polypropylene resin from poly-olefin coated catalyst |
|---|---|---|
| PENTAD (%) | | |
| mmmm | 91.32 | 93.30 |
| mmmr | 4.19 | 3.65 |
| mmmr | 0.66 | 0.69 |
| mmrr | 1.42 | 0.70 |
| mmrm + rmrr | 0.70 | 0.39 |
| rmrm | 0.18 | 0.28 |
| rrrr | 0.52 | 0.31 |
| mrrr | 0.50 | 0.29 |
| mrrm | 0.51 | 0.38 |
| TRIAD (%) | | |
| mm | 96.17 | 97.65 |
| mr | 2.30 | 1.37 |

TABLE 11-continued

PENTAD & TRIAD fraction in non-coated and poly-olefin coated catalyst.

| | Polypropylene resin from non-coated catalyst | Polypropylene resin from poly-olefin coated catalyst |
|---|---|---|
| rr | 1.53 | 0.98 |

From Table 11, it is observed that the resin obtained from poly-olefin coated catalyst has more percentage of meso and racemic forms in PENTAD and in TRIAD fraction compare to resin obtained from non-coated catalyst.

Technical Advancements

The present disclosure described herein above has several advantages including, but not limited to, the realization of:
   a process for the preparation of a catalyst with a polyolefin coat, which:
      uses low boiling solvents;
      is simple and economical; and
      requires 50% less reaction time to obtain catalyst with polyolefin coat.
   A catalyst with a polyolefin coat, which:
      has uniform morphology of the catalyst particles;
      is capable of reducing generation of polymer fines by 50%;
      has comparable catalytic productivity; and
      provides improved plant operability and throughput.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

17

The invention claimed is:

1. A process for preparation of a Ziegler-Natta catalyst with a polyolefin coat, said process comprising the following steps:

i. mixing in a reactor, a pro-catalyst and a co-catalyst in a fluid medium to obtain a slurry;

ii. stirring said slurry in an inert gas atmosphere at a temperature in the range of 20° C. to 50° C. to homogenize the slurry and generate particles of the catalyst;

iii. introducing a gaseous olefin monomer into the reactor having said catalyst, at a monomer pressure in the range of 1.0 kg/cm$^2$ to 5.0 kg/cm$^2$;

iv. polymerizing said olefin monomer on said catalyst in a controlled manner to ensure that the degree of polymerization in the form of olefin coating is in the range of 3% to 30% of the total amount of said olefin monomer, by carrying out said polymerization at a temperature in the range of 20° C. to 50° C. under continuous stirring having a stirring speed in the range of 400 rpm to 600 rpm for a time period in the range of 120 to 180 minutes, to obtain a product mixture comprising the catalyst with the polyolefin coat and an unreacted gaseous olefin monomer; and v. venting off said unreacted gaseous olefin monomer from the reactor and separating the catalyst with the polyolefin coat from the product mixture, followed by drying to obtain the catalyst with the polyolefin coat;

wherein said pro-catalyst is a transition metal catalyst supported on magnesium;

wherein the transition metal is at least one metal selected from the group consisting of scandium, titanium, vanadium, chromium, iron, cobalt, nickel, copper, zirconium, chromium and palladium;

the molar ratio of aluminum in said co-catalyst to said transition metal in said pro-catalyst is in the range of 0.5:1 to 1.5:1;

the stirring in steps (ii) and (iv) is carried out with the help of gas dispersion hallow shaft; and the step of polymerization of said olefin monomer is carried out in the presence of nitrogen.

2. The process as claimed in claim 1, wherein the co-catalyst is at least one organoaluminum compound selected from the group consisting of triethyl aluminum, tri-n-butyl aluminum, tri-isopropyl aluminum, tri-isoprenyl aluminum, tri-isobutyl aluminum, diethyl aluminum chloride, di-isobutyl aluminum chloride, triphenyl aluminum, tri-n-octyl aluminium, and tri-n-decyl aluminum.

3. The process as claimed in claim 1, wherein the fluid medium is at least one selected from the group consisting of white mineral oil, n-hexane, cyclohexane, and iso-pentane.

4. The process as claimed in claim 1, wherein the inert gas is selected from argon and nitrogen.

5. The process as claimed in claim 1, further comprising the step of:

making a catalyst with a polyolefin coat, characterized by having a mean particle size in the range of 15 to 35 μm, a surface area in the range of 35 to 41 m$^2$/g, a pore diameter in the range of 1.2 to 1.8 μm, a porosity in the range of 9% to 13% and a bulk density in the range of 0.45 to 0.63 g/cm$^3$.

6. The process as in claim 1, wherein said solvent is mineral oil.

7. The process as in claim 1, wherein said solvent is n-hexane.

\* \* \* \* \*